(12) United States Patent
Auerbach

(10) Patent No.: US 11,846,942 B2
(45) Date of Patent: *Dec. 19, 2023

(54) SYSTEM FOR MONITORING THE LANDING ZONE OF AN ELECTRIC VERTICAL TAKEOFF AND LANDING AIRCRAFT

(71) Applicant: BETA AIR, LLC, South Burlington, VT (US)

(72) Inventor: Joshua E. Auerbach, Waterbury Center, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/855,496

(22) Filed: Jun. 30, 2022

(65) Prior Publication Data

US 2023/0029059 A1  Jan. 26, 2023

Related U.S. Application Data

(63) Continuation of application No. 17/383,833, filed on Jul. 23, 2021, now Pat. No. 11,392,118.

(51) Int. Cl.
| | |
|---|---|
| *G06F 17/00* | (2019.01) |
| *G05D 1/00* | (2006.01) |
| *B64D 43/00* | (2006.01) |
| *B64D 45/08* | (2006.01) |

(52) U.S. Cl.
CPC ........... *G05D 1/0038* (2013.01); *B64D 43/00* (2013.01); *B64D 45/08* (2013.01)

(58) Field of Classification Search
CPC .. G05D 1/0038; G05D 1/0044; G05D 1/0676; B64D 43/00; B64D 45/08

USPC ............................................................. 701/2
See application file for complete search history.

(56) References Cited

U.S. PATENT DOCUMENTS

| | | | | |
|---|---|---|---|---|
| 7,286,912 B2 * | 10/2007 | Rubin | .................. | G01C 23/00 |
| | | | | 701/9 |
| 9,242,728 B2 * | 1/2016 | Morrison | ................ | B64C 27/32 |
| 10,242,580 B2 * | 3/2019 | Groden | .................. | B64C 13/16 |
| 10,535,272 B2 * | 1/2020 | Groden | .................. | G08G 5/025 |

(Continued)

OTHER PUBLICATIONS

Concept-of-Operations-for-Uncrewed-Urban-Air-Mobility (Year: 1929).*

*Primary Examiner* — Ronnie M Mancho
(74) *Attorney, Agent, or Firm* — CALDWELL INTELLECTUAL PROPERTY LAW

(57) ABSTRACT

A system for monitoring the landing zone of an electric aircraft, the system including an electric aircraft wherein the electric aircraft includes at least a sensor configured to measure a plurality of data of regarding a first potential landing zone and transmit the plurality of data to at least a flight controller. The flight controller is designed and configured to receive the plurality of data from at least a sensor, determine a landing safety datum as a function of the plurality of data and at least a safety parameter range, and transmit the landing safety datum to an output device. The output device is designed and configured to receive the plurality of data from the flight controller, and display, to the pilot, the landing safety datum and a locator component designed and configured to capture a second potential landing zone that is distinct from the first potential landing zone.

20 Claims, 10 Drawing Sheets

(56) References Cited

U.S. PATENT DOCUMENTS

| | | | |
|---|---|---|---|
| 10,535,276 B2 * | 1/2020 | Schwindt | G08G 5/045 |
| 10,921,826 B2 * | 2/2021 | Groden | B64C 13/16 |
| 11,238,745 B2 * | 2/2022 | Villa | G06Q 10/047 |
| 11,244,572 B2 * | 2/2022 | Villa | G08G 5/0034 |
| 11,328,615 B2 * | 5/2022 | Schwindt | G05D 1/0011 |
| 11,392,118 B1 * | 7/2022 | Auerbach | B64D 45/08 |

* cited by examiner

SYSTEM FOR MONITORING THE LANDING ZONE OF AN ELECTRIC VERTICAL TAKEOFF AND LANDING AIRCRAFT

CROSS-REFERENCE TO RELATED APPLICATIONS

This application is a continuation of Nonprovisional application Ser. No. 17/383,833, filed on Jul. 23, 2021, and entitled "A SYSTEM FOR MONITORING THE LANDING ZONE OF AN ELECTRIC VERTICAL TAKEOFF AND LANDING AIRCRAFT," the entirety of which is incorporated herein by reference.

FIELD OF THE INVENTION

The present invention generally relates to the field of monitoring for an electric aircraft. In particular, the present invention is directed to a system for monitoring the landing zone of an electric vertical take-off and landing aircraft.

BACKGROUND

Navigating an electric vertical take-off and landing (eVTOL) aircraft pose an array of challenges and difficulties in effectively maneuvering itself to a desired location. Not every landing zone is properly equipped to be mounted on by an electric aircraft. Considering the position of a pilot inside an electric aircraft, the inability to clearly see the environmental factors of a landing zone while approaching towards it may be hazardous to the pilot, potentially damage the electric aircraft, or compromise the flight of the electric aircraft.

SUMMARY OF THE DISCLOSURE

In an aspect, a system for monitoring a landing zone of an electric aircraft is provided. The system includes at least a sensor, the at least a sensor configured to continuously capture a plurality of data related to a first potential landing zone of an electric aircraft as the electric aircraft approaches the first potential landing zone; a processor, the processor configured to: receive the plurality of data from the at least a sensor; determine a landing safety datum as a function of the plurality of data and at least a safety parameter; and an output device, the output device configured to: receive the plurality of data and the landing safety datum from the processor; and display, to the pilot: the landing safety datum; and a locator component, the locator component configured to capture a second potential landing zone of the electric aircraft that is distinct from the first potential landing zone.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, a system for monitoring the landing zone of an electric aircraft includes an electric aircraft wherein the electric aircraft includes at least a sensor, the sensor configured to measure a plurality of data of regarding a first potential landing zone, and transmit the plurality of data to at least a flight controller. The system further includes a flight controller, the flight controller designed and configured to receive the plurality of data from at least a sensor, determine a landing safety datum as a function of the plurality of data and at least a safety parameter range, and transmit the landing safety datum to an output device. The system further includes an output device, the output device is designed and configured to receive the plurality of data from at least the flight controller, and display, to the pilot, the landing safety datum and a locator component, the locator component designed and configured to capture a second potential landing zone that is distinct from the first potential landing zone.

Figure 1:
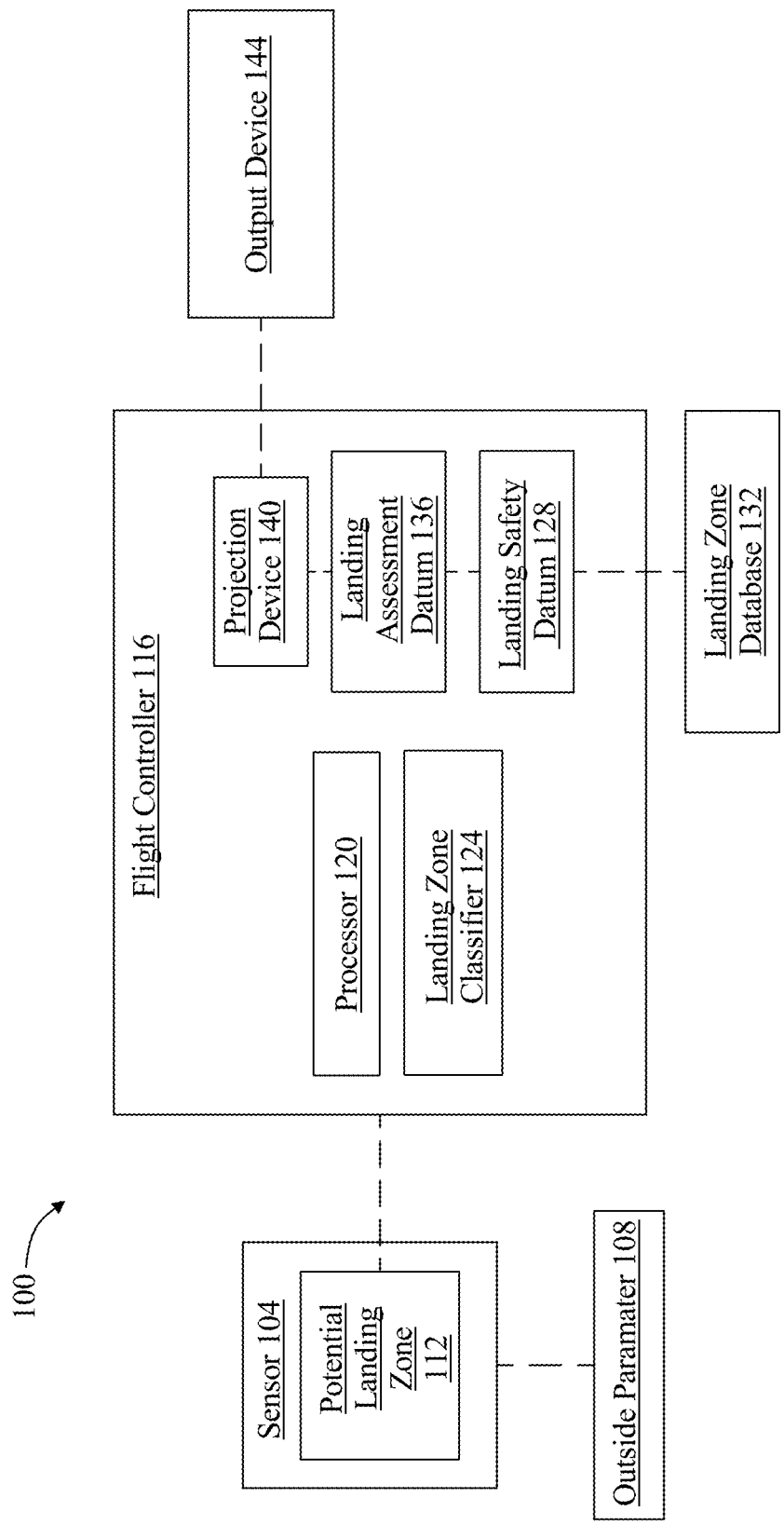
FIG. 1 is a block diagram illustrating a system for monitoring landing zone configured for use in electric aircraft.

Referring now to FIG. 1, a block diagram illustrating a system 100 for monitoring the landing zone of an electric aircraft configured for an electric aircraft is presented. The system 100 may include at least a sensor 104. At least the sensor may further include a sensor suite, the sensor suite including a plurality of individual sensors. At least a sensor 104 is configured to detect an outside parameter 108 which may include environmental factors surrounding a potential landing zone for an electric aircraft. At least a sensor 104 may further include circuitry or electronic components configured to digitize, transform, or otherwise manipulate electrical signals. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sin c function, or pulse width modulated signal. At least a sensor may include, but not limited to, a pressure sensor, proximity sensor, light sensor, pitot tubes, air speed sensors, and the like. At least a sensor 104 may include a field camera. "Field camera," for the purposes of this disclosure, is an optical device or combination of optical devices, configured to capture a field of vision as an electrical signal, to form a digital image. Field camera may include a single camera and/or two or more cameras used to capture field of vision. In a nonlimiting embodiment, two or more cameras may capture two or more perspectives for use in stereoscopic and/or three-dimensional display or output device 144, as described above. Field camera may capture a feed including a plurality of frames, such as without limitation a video feed.

With continued reference to FIG. 1, at least a sensor 104 may include at least a motion sensor. At least a motion sensor may include, without limitation, a microelectromechanical system (MEMS) sensor. "Motion sensor", for the purposes of this disclosure, is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, and the like. At least a motion sensor may include, without limitation, an inertial measurement unit (IMU). At least a motion sensor may include one or more accelerometers; one or more accelerometers may include a plurality of accelerometers, such as three or more accelerometers positioned to span three dimensions of possible acceleration, so that any direction and magnitude of acceleration in three dimensions may be detected and measured in three dimensions. At least a motion sensor may include one or more gyroscopes; one or more gyroscopes may include a plurality of gyroscopes, such as three or more gyroscopes positioned to span three dimensions of possible acceleration, so that any direction and magnitude of change in angular position in three dimensions may be detected and measured in three dimensions. At least a motion sensor may include, without limitation magnetic sensors such as Hall effect sensors, compasses such as solid-state compasses, or the like. Persons skilled in the art, upon reviewing the entirety of this disclosure, will be aware of various components and/or devices that may be used as at least a motion sensor consistently with this disclosure.

With continued reference to FIG. 1, at least sensor 104 may include a three-dimensional (3D) scanner. 3D scanner may include the use of 3D laser scanning. 3D Laser Scanning is a non-contact, non-destructive technology that digitally captures the shape of physical objects using a line of laser light. 3D laser scanners create "point clouds" of data from the surface of an object. In other words, 3D laser scanning is a way to capture a physical object's exact size and shape into the computer world as a digital 4-dimensional representation. 3D laser scanners measure fine details and capture free-form shapes to quickly generate highly accurate point clouds. 3D laser scanning is ideally suited to the measurement and inspection of contoured surfaces and complex geometries which require massive amounts of data for their accurate description and where doing this is impractical with the use of traditional measurement methods or a touch probe. In a non-limiting embodiment, a 3D scanner may capture a potential landing zone and generate a 3D model of a plot representing the landing zone for analysis described later in the disclosure.

With continued reference to FIG. 1, at least sensor 104 may be configured to detect and/or determine a plurality of ranges of an object with a laser. Determining ranges may include a technique for the measuring of distances or slant range from an observer including at least a sensor 104 to a target which may include a potential landing zone 112. Technique may include the use of active range finding methods which may include, but not limited to, light detection and ranging (LIDAR), radar, sonar, ultrasonic range finding, and the like. In a non-limiting embodiment, at least sensor 104 may include at least a LIDAR system to measure ranges including variable distances from at least the sensor 104 to a potential landing zone 112. LIDAR systems may include, but not limited to, a laser, at least a phased array, at least a microelectromechanical machine, at least a scanner and/or optic, a photodetector, a specialized GPS receiver, and the like. In a non-limiting embodiment, at least sensor 104 including a LIDAR system may target an object including a potential landing zone 112 with a laser and measure the time for at least a reflected light to return to the LIDAR system. LIDAR may also be used to make digital 4-D representations of areas on the earth's surface and ocean bottom, due to differences in laser return times, and by varying laser wavelengths. In a non-limiting embodiment the LIDAR system may include a topographic LIDAR and a bathymetric LIDAR, wherein the topographic LIDAR that may use near-infrared laser to map a plot of a land or surface representing a potential landing zone while the bathymetric LIDAR may use water-penetrating green light to measure seafloor and various water level elevations within and/or surrounding the potential landing zone. In a non-limiting embodiment, electric aircraft may use at least a LIDAR system as a means of obstacle detection and avoidance to navigate safely through environments to reach a potential landing zone.

With continued reference to FIG. 1, at least a sensor 104 of system 100 is configured to detect an outside parameter 108. Outside parameter may include, but not limited to air density, air speed, true airspeed, relative airspeed, temperature, humidity level, and weather conditions, among others. Outside parameter 108 may include velocity and/or speed in a plurality of ranges and direction such as vertical speed, horizontal speed, changes in angle or rates of change in angles like pitch rate, roll rate, yaw rate, or a combination thereof, among others. Outside parameter 108 may further include physical factors of the components of the electric aircraft itself including, but not limited to, remaining fuel or battery. Outside parameter 108 may include at least an environmental parameter. Environmental parameter may be any environmentally based performance parameter as disclosed herein. Environment parameter may include, without limitation, time, pressure, temperature, air density, altitude, gravity, humidity level, airspeed, angle of attack, and debris, among others. Environmental parameters may be stored in any suitable datastore consistent with this disclosure. Environmental parameters may include latitude and longitude, as well as any other environmental condition that may affect the landing of an electric aircraft. In a non-limiting embodiment, at least a sensor may capture an area of the outside environment representing a potential landing zone and capture the geographical data and/or composition of that area for measuring as described later in the disclosure.

With continued reference to FIG. 1, at least a sensor 104 of system 100 may be configured to measure a plurality of data such as an outside parameter 108 as a potential landing zone 112 for an electric aircraft. Potential landing zone 112 may include a plurality of data and/or signal detailing information regarding the state of the potential landing zone 112. In a non-limiting embodiment, state information may include information describing the potential landing zone's location, size of obstacles, temperature, image data, geographic data, and the like. For instance, the potential landing zone 112 may include a plot on a surface at least the length and width of the electric aircraft and capture a three-dimensional silhouette and/or surface area outline of the plot, the plot may include uneven dimensions caused by at least an outside parameter 108, to be measured by a flight controller 116 to determine the safety of the plot as a valid landing zone for the electric aircraft.

With continued reference to FIG. 1, the system 100 may include a flight controller 116. In a non-limiting embodiment, flight controller 116 may receive input from the user interacting with a computing device. Interaction of user with output device 144 may be through an input device. Examples of an input device include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, an inceptor stick, and any combinations thereof. Output device 144 may receive input from user through standard I/O interface such as ISA (Industry Standard Architecture), PCI (Peripheral Component Interconnect) Bus, and the like. Output device 144 may receive input from user through standard I/O operation. In one embodiment, Output device 144 may further receive input from user through optical tracking of motion. In one embodiment, Output device 144 may further receive input from user through voice-commands. Output device 144 may further use event-driven programming, where event listeners are used to detect input from user and trigger actions based on the input. One of ordinary skill in the art, upon reading the entirety of this disclosure would appreciate the variety of input controls that may be present in an electric aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety.

With continued reference to FIG. 1, output device 144 may further be configured to display a live feed of the outside environment. In a non-limiting embodiment, the outside environment may be dynamically captured by a camera and visually produced via the projection device 140. For instance, a pilot may be unable to physically view the outside environment and may use the output device 144 which may include an augmented reality device or heads on display which may further include a plurality of peripheral displays to replicate the outside environment as a live feed from the perspective of the electric aircraft. In a non-limiting embodiment, the live feed may further project a holographic image of the potential landing zone onto a landscape from the live feed to provide additional visual information to a pilot. For instance, the live feed may act as a video display that displays what a pilot would see from outside the electric aircraft. A person of ordinary skill in the art, after reviewing the entirety of this disclosure, would appreciate the purpose of a live feed as a foundation for the displaying of additive information regarding the status of a landing zone.

With continued reference to FIG. 1, flight controller 116, may include a processor 120. Processor 120 may include a computing device. Processor 120 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 120 may include a single computing device operating independently, or may include two or more computing device operating in concert, in parallel, sequentially or the like; two or more computing devices may be included together in a single computing device or in two or more computing devices. Processor 120 may interface or communicate with one or more additional devices as described below in further detail via a network interface device. Network interface device may be utilized for connecting processor 120 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 120 may include but is not limited to, for example, a computing device or cluster of computing devices in a first location and a second computing device or cluster of computing devices in a second location. Processor 120 may include one or more computing devices dedicated to data storage, security, distribution of traffic for load balancing, and the like. Processor 120 may distribute one or more computing tasks as described below across a plurality of computing devices of computing device, which may operate in parallel, in series, redundantly, or in any other manner used for distribution of tasks or memory between computing devices. Processor 120 may be implemented using a "shared nothing" architecture in which data is cached at the worker, in an embodiment, this may enable scalability of system 100 and/or computing device.

With continued reference to FIG. 1, Processor 120 may be designed and/or configured to perform any method, method step, or sequence of method steps in any embodiment described in this disclosure, in any order and with any degree of repetition. For instance, Processor 120 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 120 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 120 may include a device and/or component incorporated in and/or attached to an output device 144 which may include an augmented reality device. For instance, processor 120 may include a microcontroller, system on chip, FPGA, or other compact hardware element that is incorporated in and/or attached to augmented reality device 104. Alternatively or additionally, processor 120 may include a device communicating with augmented reality device via a wireless and/or wired connection. In an embodiment, processor 120 may include a device incorporated in augmented reality device and a device communicating therewith via wired and/or wireless connection. Processor 120 may receive at least a potential landing zone 112 from at least a sensor 104 and at least an outside parameter 108 as training data. Flight controller 116 may further be configured to continuously capture the outside parameter 108 of a potential landing zone as a function of a processor 120 and at least a sensor 104 as an electric aircraft approaches a potential landing zone. In an embodiment, the outside parameter surrounding a potential landing zone may include new environmental elements that at least the sensor may capture to constantly and/or dynamically calculate the validity of the landing zone's potential.

Still referring to FIG. 1, processor 120 may be designed and/or configured to perform any method, method step, or sequence of method steps in any embodiment described in this disclosure, in any order and with any degree of repetition. For instance, processor 120 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 120 may perform any step or sequence of steps as described in this disclosure in parallel, such as simultaneously and/or substantially simultaneously performing a step two or more times using two or more parallel threads, processor 120 cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, flight controller 116 may include a landing zone classifier 124. The flight controller 116 may further be configured to generate and/or classify images using a landing zone classifier 124. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 120 and/or another device may generate a classifier using a classification algorithm, defined as a processes whereby a processor 120 derives a classifier from training data. Classification may be performed using, without limitation, linear classifiers such as without limitation logistic regression and/or naïve Bayes classifiers, nearest neighbor classifiers such as k-nearest neighbors classifiers, support vector machines, least squares support vector machines, Fisher's linear discriminant, quadratic classifiers, decision trees, boosted trees, random forest classifiers, kernel estimation, learning vector quantization, and/or neural network-based classifiers.

With continued reference to FIG. 1, landing zone classifier 124 may be generated, as a non-limiting example, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, landing zone classifier 124 may be generated using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 3, 4]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1 flight controller 116 and/or output device 144 may be configured to train landing zone classifier 124 using any classification algorithm described above operating on training data. "Training data," as used herein, is data containing correlations that a machine-learning process, such as a classifier, may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and further referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. Training data used to train landing zone classifier 124 may include a plurality of entries, each including attributes of an image of at least a potential landing zone, which may be used to classify the image of potential landing zones to other images in training data.

Still referring to FIG. 1, flight controller 116 may include generation of a landing safety datum 128. A "landing safety datum," as for the purposes of this disclosure, is an electronic signal representing at least an element of data or set of elements of data correlated to a potential landing zone representing an evaluation of health and/or safety states of the potential landing zone as described in the entirety of this disclosure. Landing safety datum 128 may include a fast photodiode (FPD) measurement unit. The FPD may include an electronic device that accurately measure pulse-to-pulse energy from the data received from at least a sensor or LIDAR system. In a non-limiting embodiment, landing safety datum may include an evaluation wherein the evaluation may include comparing a plurality of data from outside parameter 108 and potential landing zone 112, against one or more acceptance criteria which may further include a safety parameter from a landing zone database 132. For instance, the plurality of data may be required to contain data of a certain type, size, information range, ensuring that an instance of the plurality of data is in compliance with the acceptance criteria may, in some cases, constitute evaluation. Landing safety datum 128 may include a plurality of data from at least an outside parameter 108 and potential landing zone wherein outside parameter and potential landing zone can include any outside parameter or potential landing zone described herein. In a non-limiting embodiment, flight controller may configure the landing safety datum to determine a percentage describing the validity of a potential landing zone for an electric aircraft to safely land by comparing the outside parameters with a table in a landing zone database 132, wherein the landing zone database may include at least a table and calculating the percentage from the comparison.

With continued reference to FIG. 1, landing safety datum 128 wherein landing safety datum 128 is determined as a function of the plurality of data wherein the plurality of data includes any plurality of data described in the entirety of this disclosure and at least a safety parameter. "Safety parameter," for the purposes of this disclosure, refer to a numerical range or set representing an acceptance criterion for the evaluation of the plurality of data. Determining landing safety datum 128 may further include receiving safety parameter to compare from a landing zone database 132. Safety parameter may include a safety threshold. In a non-limiting embodiment, the landing zone database 132 may provide an acceptance criterion as a function of the safety parameter to compare the incoming plurality of date for the determination of a landing safety datum 128. For instance, and without limitation, the flight controller 116 may configure the landing safety datum 128 to evaluate and/or compare the plurality of data to a safety threshold level wherein the safety threshold level represents a numerical range or limit for the measurement of data comprising elements of at least an outside parameter 108 and potential landing zone 112 at least a sensor 104 including LIDAR system. Safety threshold level may include a numerical range or limit representing an ideal or compliant health status of the potential landing zone as a function of the measurements received by a LIDAR system. "Health status," for the purposes of this disclosure refer to an electrical signal representing an evaluation of the potential landing zone as a function of at least a sensor and LIDAR system. In a non-limiting embodiment, health status may include an infrared mapping of the potential landing zone. In a non-limiting embodiment, the landing safety datum 128 may evaluate the health status of the potential landing zone by comparing at least the numerical measurement values of the various layers and/or colors of an infrared mapping with a safety threshold that may include the ideal or compliant health status represented as another infrared mapping and determine a numerical percentage of how much the health status of the potential landing zone falls within or above the ideal or compliant health status of the safety threshold level.

With continued reference to FIG. 1, determining landing safety datum 128 may include using only an ideal health status as a function of at least a safety parameter and at least a landing zone database 132. Safety parameter may include only an ideal health status to be compared and evaluated by an incoming health status of a potential landing zone. For instance, and without limitation, the landing safety datum may directly evaluate a health status of a potential landing zone 112 to the ideal health status of at least a safety parameter and at least a landing zone database 132 and generate a percentage representing the level of which the incoming health status is an exact match to the ideal health status of the safety parameter. In a non-limiting embodiment, safety parameter may include at least a criterion including a set of Boolean determinations. Boolean determinations may include true/false statements and/or verifications including, but not limited to, environmental hazard occupation of a potential landing zone, stable wind speeds or temperature, and the like. Set of Boolean determinations, in some embodiments, may be an example of a safety threshold level. In a non-limiting embodiment, Boolean determinations may include and/or represent a landing confirmation 308.

Figure 2:
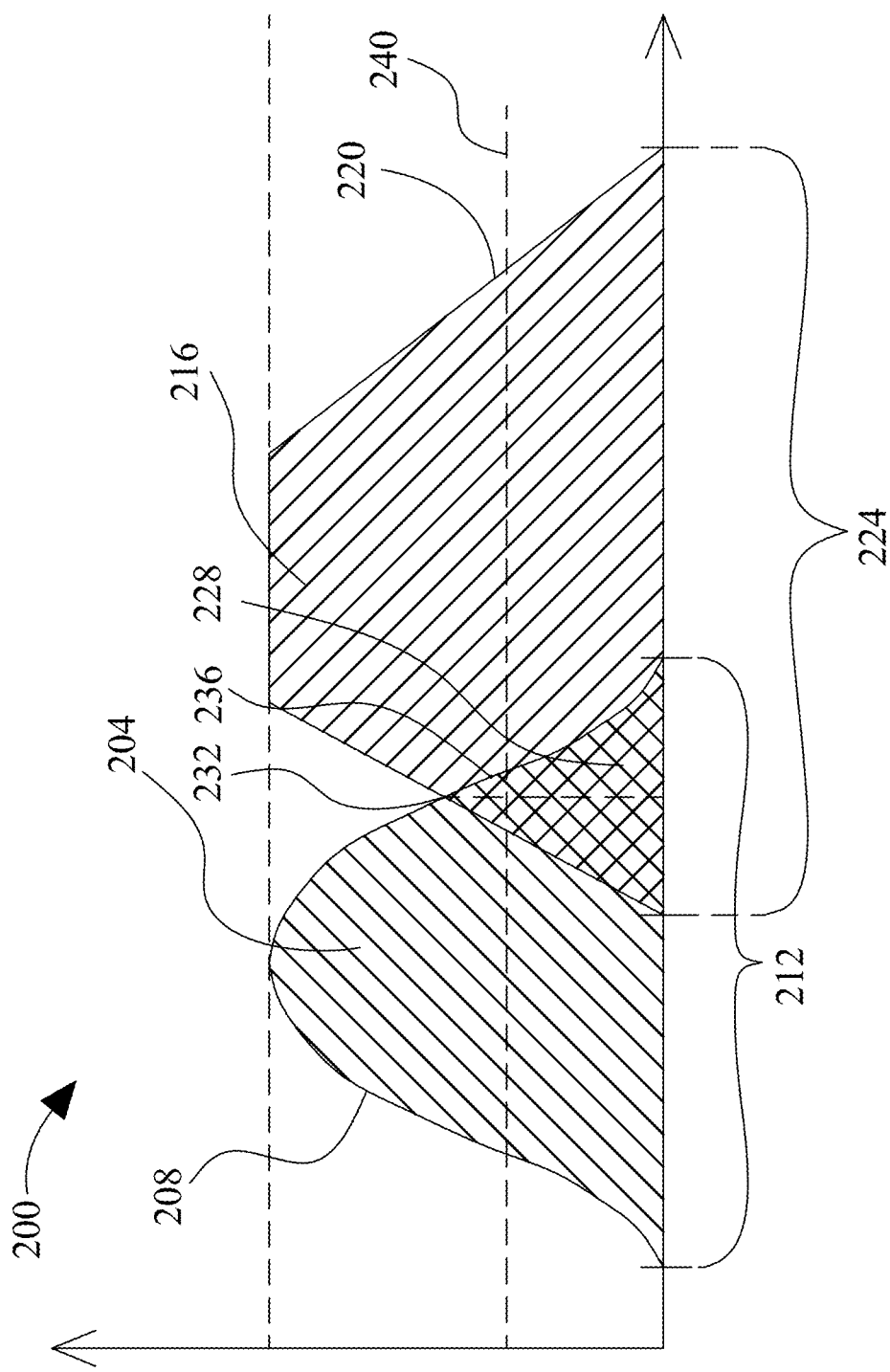
FIG. 2 is a block diagram illustrating exemplary embodiments of fuzzy sets for safety comparison.

Now referring to FIG. 2, an exemplary embodiment of fuzzy set for safety comparison 200 for a landing safety datum is illustrated. A first fuzzy set 204 may be represented, without limitation, according to a first membership function 208 representing a probability that an input falling on a first range of values 212 is a member of the first fuzzy set 204, where the first membership function 208 has values on a range of probabilities such as without limitation the interval [0,1], and an area beneath the first membership function 208 may represent a set of values within first fuzzy set 204. Although first range of values 212 is illustrated for clarity in this exemplary depiction as a range on a single number line or axis, first range of values 212 may be defined on two or more dimensions, representing, for instance, a Cartesian product between a plurality of ranges, curves, axes, spaces, dimensions, or the like. First membership function 208 may include any suitable function mapping first range 212 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 204 may represent any value or combination of values as described above, including predictive prevalence value, probabilistic outcome, any resource datum, any niche datum, and/or any combination of the above. A second fuzzy set 216, which may represent any value which may be represented by first fuzzy set 204, may be defined by a second membership function 220 on a second range 224; second range 224 may be identical and/or overlap with first range 212 and/or may be combined with first range via Cartesian product or the like to generate a mapping permitting evaluation overlap of first fuzzy set 204 and second fuzzy set 216. Where first fuzzy set 204 and second fuzzy set 216 have a region 328 that overlaps, first membership function 208 and second membership function 220 may intersect at a point 232 representing a probability, as defined on probability interval, of a match between first fuzzy set 204 and second fuzzy set 216. Alternatively or additionally, a single value of first and/or second fuzzy set may be located at a locus 236 on first range 212 and/or second range 224, where a probability of membership may be taken by evaluation of first membership function 208 and/or second membership function 220 at that range point. A probability at 228 and/or 232 may be compared to a threshold 240 to determine whether a positive match is indicated. Threshold 240 may, in a non-limiting example, represent a degree of match between first fuzzy set 204 and second fuzzy set 216, and/or single values therein with each other or with either set, which is sufficient for purposes of the matching process; for instance, threshold may indicate a sufficient degree of overlap between a plurality of data including a first health status, wherein first health status may include at least an outside parameter 108 and at least a potential landing zone 112, and/or at a safety parameter, wherein safety parameter may include an ideal health status as a function of at least a landing zone database 132, for combination to occur as described above. There may be multiple thresholds; for instance, a second threshold may include a threshold for a different measurement unit for plurality of data unique to the first threshold which may include infrared mapping. Second threshold may include measurements of level of green-light for the mapping and measuring of seafloor, riverbed elevation, water level, and the like. Each threshold may be established by one or more user inputs or automatically by a flight controller. Each threshold and a safety parameter may be determined using training data that correlates potential landing zone 112 data including health status and outside parameter 108 with degrees of safety including at least a safety threshold level as a function of a machine-learning model as described in further detail below.

Still referring to FIG. 2, in an embodiment, a degree of match between fuzzy sets may be used to rank one health status against another. For instance, at least a sensor 104 including a LIDAR system may detect more than one potential landing zones if two potential landing zones have fuzzy sets closely matching an ideal health status or above a safety threshold level fuzzy set by having a degree of overlap exceeding a threshold, wherein flight controller 116 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple potential landing zones may be presented to a user in order of ranking.

Referring back to FIG. 1, flight controller 116 of system 100 may include a projection device 140. "Projection device," for the purposes of this disclosure, is defined as a device that inserts images into field of vision. Projection device 140 may include a software and/or hardware component that adds inserted images into an output device 144 signal to be rendered on the output device 144. Projection device 140 may make use of reflective waveguides, diffractive waveguides, or the like to transmit, project, and/or output device 144 images. For instance, and without limitation, projection device 140 and/or output device 144 may project images onto a display for a pilot to see. In a non-limiting embodiment, the projection device 140 may receive data from a landing assessment datum 136 about the status of a potential landing zone and render an image to be projected onto an output device 144 or at least an augmented reality device. A person of ordinary skill in the art, upon reviewing the entirety of this disclosure, would appreciate the use of a projection device to render images from an input of various data and information.

Referring now to FIG. 1, a non-limiting exemplary embodiment of a landing zone database 132 is illustrated. Outside parameter 108 and/or potential landing zone 112 for a plurality of subjects, for instance for generating a training data classifier 316, may be stored and/or retrieved in landing zone database 132. Outside parameter 108 and/or potential landing zone 112 data from a plurality of subjects for generating training data may also be stored and/or retrieved from landing zone database 132. Processor 120 may receive, store, and/or retrieve training data, outside parameter, environmental parameter, aircraft component parameter, and the like, from landing zone database 132. Computing device 104 may store and/or retrieve machine-learning models, classifiers, among other determinations, I/O data, heuristics, algorithms, and the like, from landing zone database 132.

Continuing in reference to FIG. 1, landing zone database 132 may be implemented, without limitation, as a relational database, a key-value retrieval database such as a NOSQL database, or any other format or structure for use as a database that a person skilled in the art, upon reviewing the entirety of this disclosure, would recognize as suitable upon review of the entirety of this disclosure. Landing zone database 132 may alternatively or additionally be implemented using a distributed data storage protocol and/or data structure, such as a distributed hash table and the like. Landing zone database 132 may include a plurality of data entries and/or records, as described above. Data entries in landing zone database 132 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistent with this disclosure.

Further referring to FIG. 1, landing zone database 132 may include, without limitation, environmental table, landing table, or heuristic table. Determinations by a machine-learning process, machine-learning model, ranking function, and/or classifier, may also be stored and/or retrieved from the landing zone database 132. As a non-limiting example, landing zone database 132 may organize data according to one or more instruction tables. One or more landing zone database 132 tables may be linked to one another by, for instance in a non-limiting example, common column values. For instance, a common column between two tables of landing zone database 132 may include an identifier of a submission, such as a form entry, textual submission, accessory device tokens, local access addresses, metrics, and the like, for instance as defined herein; as a result, a search by a computing device 120 may be able to retrieve all rows from any table pertaining to a given submission or set thereof. Other columns may include any other category usable for organization or subdivision of data, including types of data, names and/or identifiers of individuals submitting the data, times of submission, and the like; persons skilled in the art, upon reviewing the entirety of this disclosure, will be aware of various ways in which data from one or more tables may be linked and/or related to data in one or more other tables. In a non-limiting embodiment, one or more tables may include data regarding outside parameter 108 and/or potential landing zone 112, thresholds, scores, metrics, values, categorizations, and the like, that system 100 may use to calculate, derive, filter, retrieve and/or store at least a landing assessment datum 136 and/or landing safety datum 128, identifiers related with cohorts of users, and the like. In a non-limiting embodiment, one or more tables may include, without limitation, a heuristic table, which may organize rankings, scores, models, outcomes, functions, numerical values, scales, arrays, matrices, and the like, that represent determinations, probabilities, metrics, parameters, values, standards, indexes, and the like, include one or more inputs describing potential mathematical relationships, as described herein. In a non-limiting embodiment, the processor 120 may calculate the percentage in which a potential landing zone is valid for a landing of an electric aircraft wherein one hundred percent may represent a potential landing zone is, without flaw and in consideration of the information consisting of the outside parameter and landing zone database, is safe for an electric aircraft. In a non-limiting embodiment, processor 120 may calculate the percentage in which a potential landing zone is valid as zero percent in which the zero percent may include an indication that the potential landing zone is invalid or a no-land zone in which a pilot may understand and locate a new or second potential landing zone. In a non-limiting embodiment, a percentage representing the validity or non-validity of a potential landing zone may further include a grade status a pilot may understand in which the pilot may, in accordance to the pilot's own volition, execute a landing based on the grade status of the potential landing zone, wherein a higher percentage represents a higher grade and a lower percentage represents a lower grade, the grade representing the quality of the potential landing zone for an electric aircraft. In a non-limiting embodiment, a threshold inside a landing zone database 132 may include a percentage of eighty percent wherein the eighty percent may represent a grade and/or percentage the processor 120 calculates of a potential landing zone 112 or received from a landing safety datum 128 the potential landing zone 112 must reach to be classified as, but not limited to, safe landing zone, valid landing zone, and the like. The threshold's percentage may include any percent above fifty percent. In a non-limiting embodiment, a potential landing zone's 112 percentage and/or grade below the threshold percentage may be classified as, but not limited to, unsafe landing zone, invalid landing zone, no-land zone, and the like. A person of ordinary skill in the art, upon reviewing the entirety of this disclosure, would appreciate the various levels of classification and percentage threshold for the purposes of classification as disclosed herein.

Still referring to FIG. 1, system 100 may include flight controller 116 to generate a landing assessment datum 136 as a function of at least a machine-learning model and at least a landing safety datum 128. A "landing assessment datum," as used in this disclosure, is a determination about a current chosen potential landing zone, which may include a first potential landing zone for the electric aircraft according to at least a landing zone classifier 124, outside parameter 108, potential landing zone 112, and landing safety datum 128. Landing assessment datum 136 may include landing zone classification, such as "safe landing zone", "unsafe landing zone", and the like. Landing assessment datum 136 may include a designation regarding a type of landing zone an electric aircraft may potentially land on including an indicator representing at least a land and/or no land symbol. Landing assessment datum 136 may include a percentage indicating the level and/or grade of the quality of a potential landing zone 112. Landing assessment datum 136 may include a predictive classification of a potential landing zone as an electric aircraft is approaching the potential landing zone. Landing assessment datum 136 may be configured to present the determination of the potential landing zone as the flight controller continuously captures new training data surrounding the potential landing zone. For instance, the percentage of the potential landing zone as presented in landing assessment datum 136 may constantly change as a factor of new environmental elements being received by at least the flight controller 116.

Continuing in reference to FIG. 1, assigning a potential landing zone's landing percentage, grade, or combination thereof, to landing assessment datum 136 may include classifying the potential landing zone 112 to the landing assessment datum 136 using landing zone classifier 124 which may use a machine-learning process, and assigning the potential landing zone 112 as a function of the classifying. Machine-learning process may include any machine-learning process, algorithm, and/or model performed by a machine-learning module, as described in further detail below. classification machine-learning process may generate a classifier using training data. Training data may include any training data described herein. Training data may originate from any source as described above. A "classifier" may include a machine-learning model, such as a mathematical model, neural net, or program generated by a machine learning algorithm known as a "classification algorithm," as described in further detail below. Classifier 124 may further provide "classification" by sorting inputs, such as the data in potential landing zone 112, into categories or bins of data, such as classifying the data into a landing assessment datum 136. Classifier may output the bins of data and/or labels associated therewith. In non-limiting illustrative examples, training data used for such a classifier may include a set of outside parameters 108 as described herein as it relates to classes of safe, unsafe, land, or no-land, landing zones, and the like. Thus, a classification machine-learning process may assign a landing assessment datum 136 as a function of the classifying.

Continuing in reference to FIG. 1, a classification machine-learning process for landing zone classifier 124 may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, a classifier may classify elements of training data to elements that characterizes a sub-population, such as a subset of outside parameter 108 and/or other analyzed items and/or phenomena for which a subset of training data may be selected, for generating specified training data sets for subsequent process(es) described herein.

Continuing in reference to FIG. 1, processor 120 may classify the potential landing zone 112 to the landing assessment datum 136 using a classification machine-learning process and assign the landing assessment datum 136 as a function of the classifying. For instance and without limitation, training data may include sets of outside parameter 108, as described above, for large cohorts of users, from a variety of locations. A classification machine-learning process may be trained with training data to determine algorithms for sorting potential landing zone 112 as a function of different landing zones and trends of length and width of a surface, levels of unevenness of a surface, and the like. Such training data may originate from a variety of sources, for instance from a pilot input using a graphical user interface, augmented reality device, a locator component, and the like. Training data may similarly originate from any source, as described above, for outside parameter 108 and determining at least a landing assessment datum 136.

Continuing in reference to FIG. 1, classification may include identifying which set of landing assessment datum 136 a parasitic background 112 observation, or set of observations, belongs. Classification may include clustering based on pattern recognition, wherein the presence of outside parameter 108 identified in potential landing zone 112 relate to a particular landing assessment datum 136. Such classification methods may include binary classification, where the potential landing zone 112 is simply matched to each existing landing assessment datum 136 and sorted into a category based on a "safe"/"unsafe" or "land"/"no-land" match. Classification may include weighting, scoring, or otherwise assigning a numerical valuation to data elements in potential landing zone 112 as it relates to each landing assessment datum 136. Such a score may represent a likelihood, probability, or other statistical identifier that relates to the classification into landing assessment datum 136, where the highest score may be selected depending on the definition of "highest". In this way, a classification machine-learning process may be free to create new classification categories as a function of how well a user may be categorized to existing categories.

Still referring to FIG. 1, the system 100 may include a flight controller 116 configured to transmit landing assessment datum 136 to an output device 144 via a projection device 140. Output device may further include a pilot display. Output device", for the purposes of this disclosure, refers to a visual apparatus that is comprised of compact flat panel designs, liquid crystal display, organic light-emitting diode, or combination thereof to present visual information superimposed on spaces. Display may include a graphical user interface (GUI), multi-functional display (MFD), primary flight display (PFD), gages, dials, screens, touch screens, speakers, haptic feedback device, live feed, window, combination thereof, or another display type not listed here. In a nonlimiting embodiment, display may include a mobile computing device like a smartphone, tablet, computer, laptop, client device, server, a combination thereof, or another undisclosed display alone or in combination. Display may be disposed in at least a portion of a cockpit of an electric aircraft. Display may be a heads-up display (HUD) disposed in goggles, glasses, eye screen, or other headwear a pilot or user may be wearing. Display may include augmented reality, virtual reality, or combination thereof.

Figure 3:
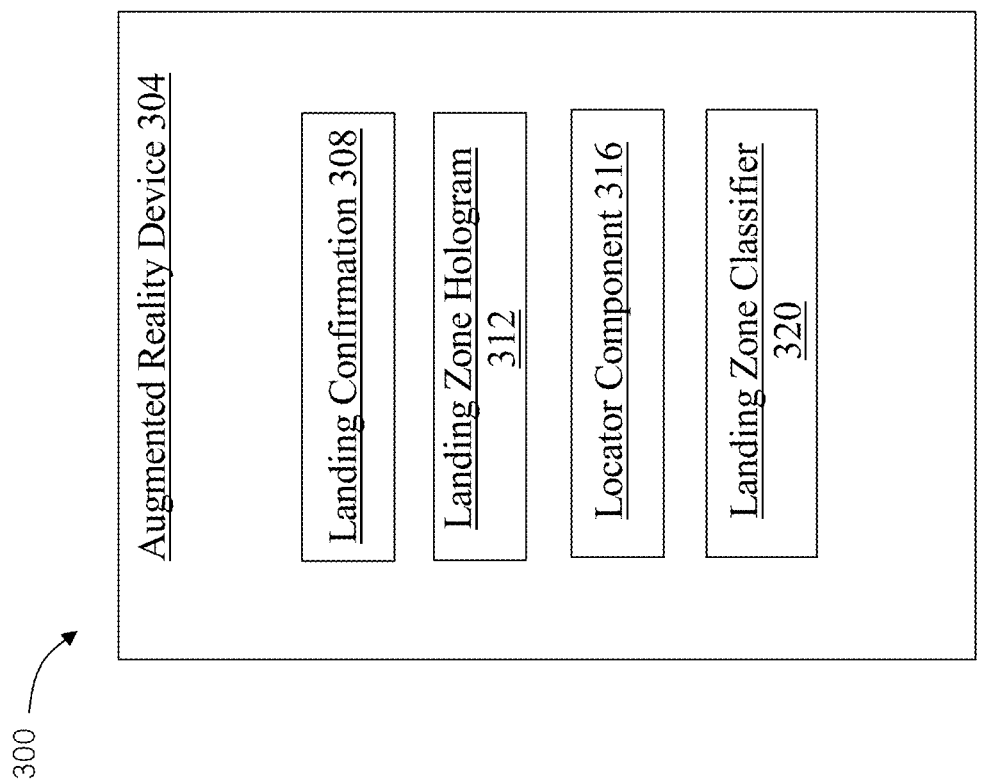
FIG. 3 illustrates a schematic embodiment of an augmented reality device.

Now referring to FIG. 3, an illustration of a schematic embodiment of an augmented reality device is presented. System 300 includes an output device which may include an augmented reality device 304. Augmented reality device 304 may include hardware components for augmented reality including a processor, display, sensor, and input device. Augmented reality device may include a configuration that supports an interface with touch inputs from a user such as, but not limited to, a touchpad, touchscreen, controller, inceptor stick, or combination thereof and described herein. Augmented reality device 304 may include monitor display that may display information in pictorial form. Monitor display may include visual display, computer, and the like. For example, monitors display may be built using liquid crystal display technology that displays to the pilot information from a computer's user interface. Output device may include any processor and/or computing device containing any processor suitable for use in and/or with augmented reality device 104 as described above. Output device may include any component and/or element suitable for use with augmented reality over-head display. The display may further include at least a peripheral display. The peripheral display may further be mounted to a pilot's head that is in the peripheral of the user's field of view. In a non-limiting embodiment, the pilot interface may view the outside environment as a function of at least a sensor and flight controller and generate a focal point as a dot on the at least peripheral display. Output device may be designed and/or configured to perform any method, method step, or sequence of method steps in any embodiment described in this disclosure, in any order and with any degree of repetition. For instance, augmented reality device 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Augmented reality device 304 may perform any step or sequence of steps as described in this disclosure in parallel, such as simultaneously and/or substantially simultaneously performing a step two or more times using two or more parallel threads, augmented reality device 304 cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 3, augmented reality device 304 may include may be implemented in any suitable way, including without limitation incorporation of or in a head mounted display, a head-up display, a display incorporated in eyeglasses, googles, headsets, helmet display systems, or the like, a display incorporated in contact lenses, an eye tap display 132 system including without limitation a laser eye tap device, VRD, or the like. Augmented reality device may alternatively or additionally be implemented using a projector, which may display images received from offsite surgeon, as described in further detail below, onto an operation locus as described in further detail below. Persons skilled in the art, upon reviewing the entirety of this disclosure, will be aware of various optical projection and/or display technologies that may be incorporated in augmented reality device 104 consistently with this disclosure. Augmented reality device 304 may implement a stereoscopic display. A "stereoscopic display," as used in this disclosure, is a display that simulates a user experience of viewing a three-dimensional space and/or object, for instance by simulating and/or replicating different perspectives of a user's two eyes; this is in contrast to a two-dimensional image, in which images presented to each eye are substantially identical, such as may occur when viewing a flat screen display. Stereoscopic display may display two flat images having different perspectives, each to only one eye, which may simulate the appearance of an object or space as seen from the perspective of that eye. Alternatively or additionally, stereoscopic display may include a three-dimensional display such as a holographic display or the like. Persons skilled in the art, upon reviewing the entirety of this disclosure, will be aware of various alternative or additional types of stereoscopic display that may be employed in augmented reality device 104.

With continued reference to FIG. 3, system 300 may include a landing confirmation 308. "Landing confirmation," for the purposes of this disclosure, is a symbol or sign indicating the status of a potential landing zone and/or quality of the potential landing zone. In a non-limiting embodiment, the symbol may include a warning sign in the even the potential landing zone is not appropriate for an electric aircraft to land. In a non-limiting embodiment, the symbol may include at least a land or no-land indicator. Landing confirmation 308 may further include a status grade from at least the assessment datum 136 and/or a landing safety percentage. In a non-limiting embodiment, the symbol indicating a valid landing of an electric aircraft on the potential landing zone or percentage may be presented as a blinking green-light pattern. In a non-limiting embodiment, in the event that the potential landing zone is unfit for landing and/or displaying a no-land indicator, the augmented reality device 304 may display a blinking red-light pattern. Landing confirmation 308 may include an abbreviation, sign, or combination thereof. A person of ordinary skill in the art, upon reviewing the entirety of this disclosure, would appreciate the unique visual identifiers for various classifications of the potential landing zone as a landing confirmation as described herein.

Still referring to FIG. 3, system 300 may include a landing zone hologram 312. Landing zone hologram 312 may include a silhouette of the potential landing zone and/or plot of surface that at least a sensor has captured and/or is capturing. In a non-limiting embodiment, the silhouette of the potential landing zone may be presented as a function of a 3D scanner and be outlined onto a display of the augmented reality device 304 as a highlighted outline that identifies a location of the outside environment as the potential landing zone as a function of the augmented reality device 304. Landing zone hologram 312 may be configured to represent a focal point for a pilot to follow as a desired destination and/or location for the flight and/or landing of an electric aircraft. Landing zone hologram 312 may include a 3D model of the potential landing zone which may include the length, width, and height of the landing zone as a result of any environmental elements that may affect the flatness or unevenness of the surface of the landing zone.

Still referring to FIG. 3, system 300 may include a locator component 316. A "locator component," as used in this disclosure, is a device and/or component that a user can use to point a cursor at a point on a display 132 and/or to draw on an image depicted in the display 132. A locator component 316 may include without limitation a wired or wireless mouse, a touchscreen, a game controller, or the like. A locator component 316 may include a motion-capture device, such as without limitation a device that tracks motion of pilot's finger and/or hand, which may be implemented in any way suitable for implementation of at least a sensor 104 as described above. In a non-limiting embodiment, a pilot may approach a first potential landing zone the flight controller has determined to be a valid and/or safe landing zone for the electric aircraft but may change its determination as the electric aircraft approaches the first landing zone. The pilot may use the locator component 316 to point to another plot or surface as a second potential landing zone as a function of the augmented reality device 304 displaying a live feed of the outside environment. The flight controller 116 recalculate and generate a new landing assessment datum of the second potential landing zone. In a non-limiting embodiment, a pilot may drag a cursor towards a second potential landing zone and the augmented reality device may generate a second landing zone hologram covering the plot of surface encompassing the second potential landing zone in which at least a sensor may capture which may give a clearer view of what at least the sensor is capturing as the pilot's position in an electric aircraft may cause an inability to view the new potential landing zone. In a non-limiting embodiment, the area in which at least a sensor may predict to be a new potential landing zone may include the landing zone hologram to follow the cursor of the pilot or pilot input. Persons skilled in the art, upon reviewing the entirety of this disclosure, will be aware of various ways in which a locator device may be implemented consistently with this disclosure.

Still referring to FIG. 3, system 300 may include landing zone classifier 300 which is any landing zone classifier described herein. Landing zone classifier 300 may further be used to classify data as a function of a second potential landing zone as described herein. A person of ordinary skill in the art, upon reviewing the entirety of this disclosure, would appreciate the incorporation of another landing zone classifier in the context of an augmented reality device.

Figure 4:
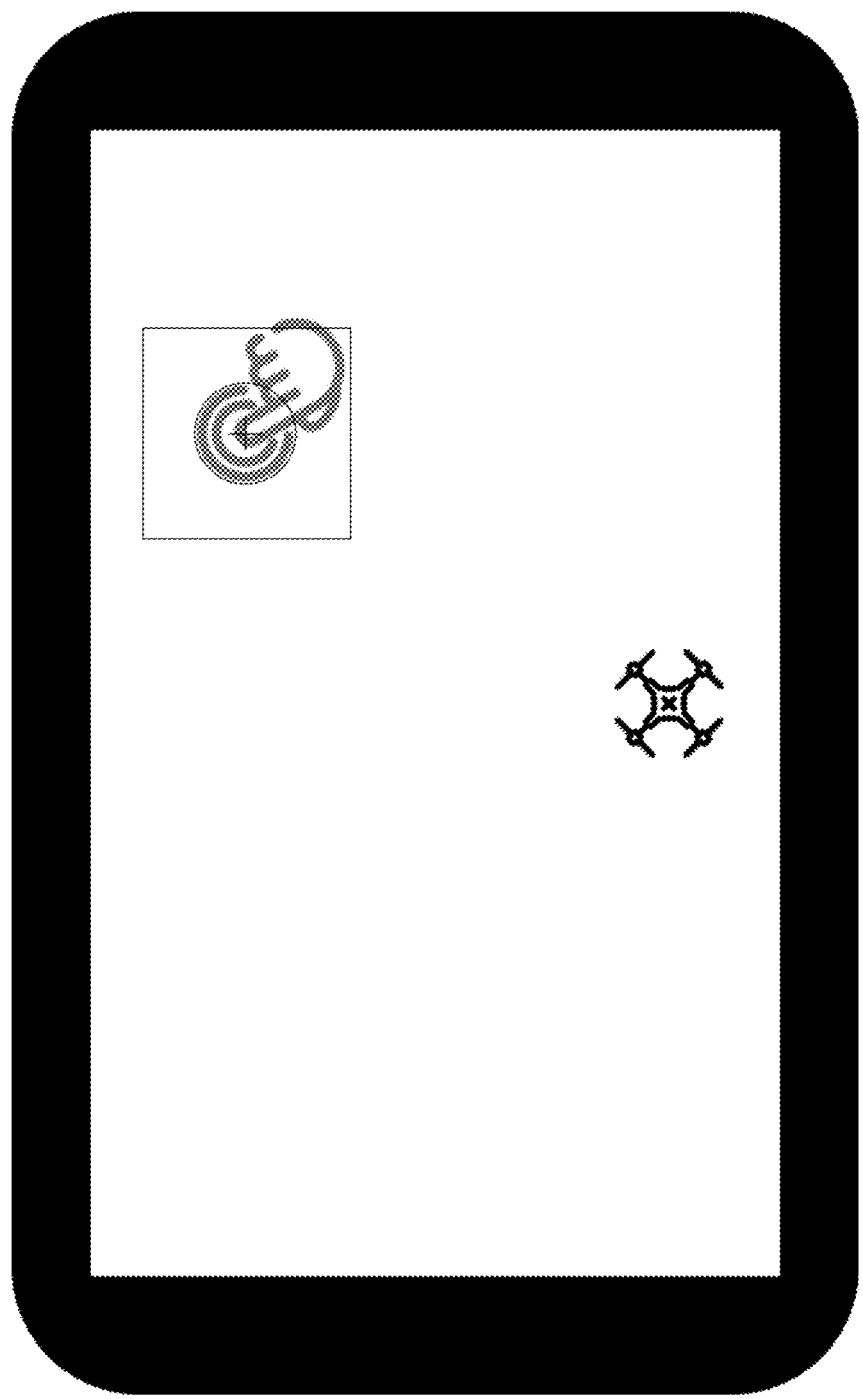
FIG. 4 is a representative screenshot depicting one aspect of an exemplary GUI interface implemented in accordance with aspects of the invention.

Now referring to FIG. 4, an exemplary screenshot of receiving, at the augmented reality device 304 which may include a GUI, a locator component 316 from a user as a function of the user's interaction with the augmented reality device is illustrated. As described above, the GUI may be displayed through a device with touch screen capability. In one embodiment, user may select a point is space as a second potential landing zone by touching the desired point on the screen. In one embodiment, the GUI may display landing locations where user may choose by clicking on the desired location. In a nonlimiting example, user may be presented with buttons in a map representing landing locations, where user may choose the desired location by clicking on a button. In another nonlimiting example, user may be able to select a second potential landing location and also an intermediate landing location, where controller will perform calculations as a function of the intermediate objective, and once reached, controller will calculate potential of the second landing zone as a function of the landing zone database 132, outside parameter, and at least a landing zone classifier 124.

Figure 5:
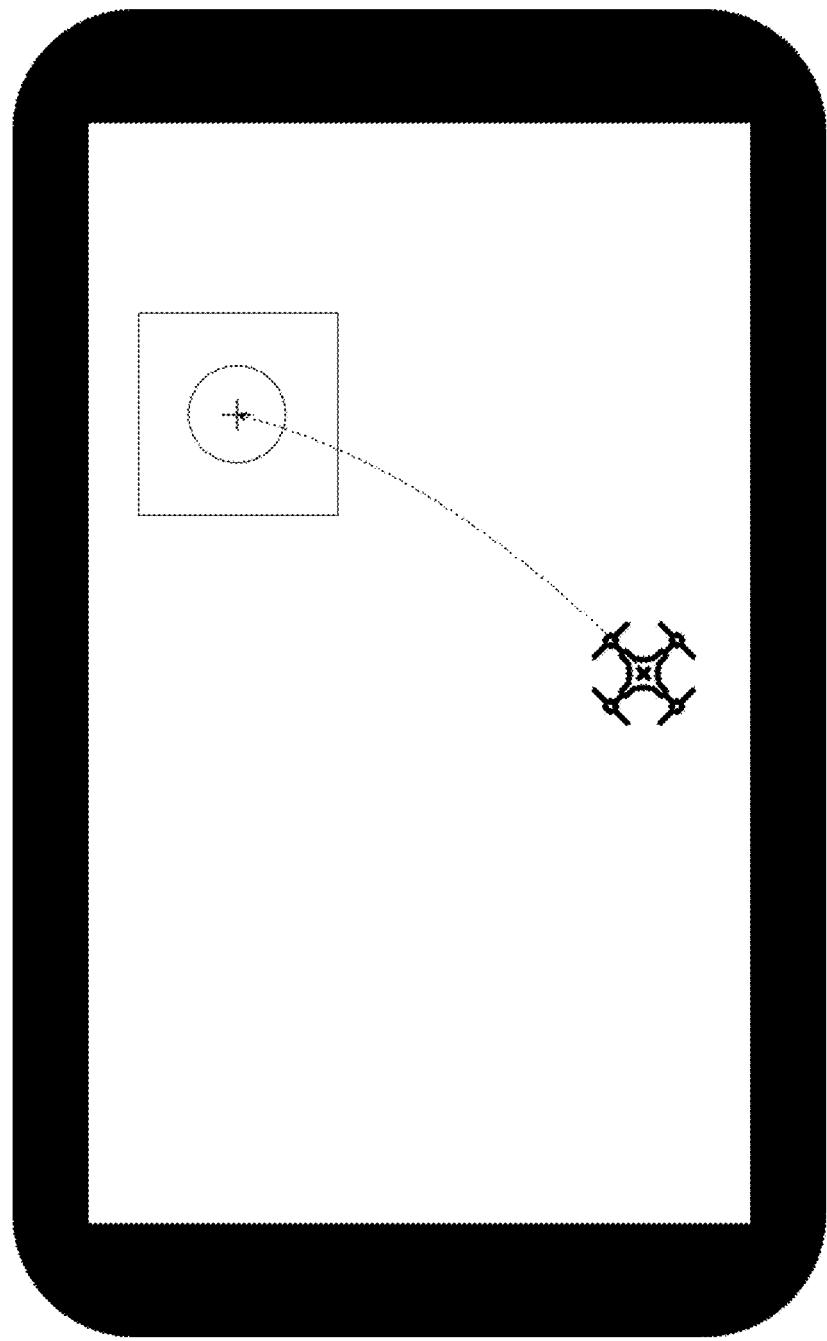
FIG. 5 is a representative screenshot depicting another aspect of an exemplary GUI interface implemented in accordance with aspects of the invention.

Now referring to FIG. 5, another exemplary screenshot of displaying, at the augmented reality device 304 which may include a GUI, the control input to a user is illustrated. In one embodiment, additionally to a flight plan, the GUI may display the second potential landing zone and a directional line once objective is nearby. In one embodiment, GUI may display a directional path to the second potential landing location when pilot inputs a new location as a function of the locator component 316. In a nonlimiting example, GUI may display a dotted path additionally to the suggested maneuvers and a graphical representation of the second potential landing zone when an electric aircraft approaches near the second potential landing zone as to assist a pilot when landing or reaching objective. In another nonlimiting example, GUI 104 may display a dotted line connected to the second potential landing zone as to keep user informed of direction of the second potential landing zone.

Figure 6:
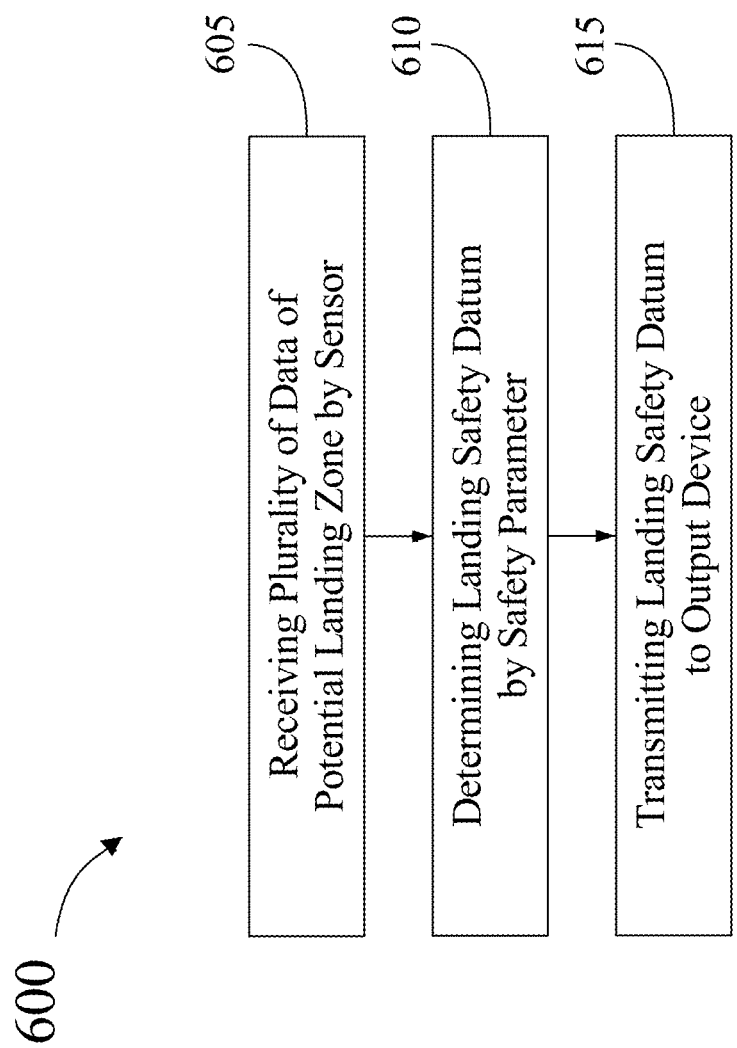
FIG. 6 is a flow diagram illustrating an exemplary method of monitoring a potential landing zone by a flight controller.

Now referring to FIG. 6, a flow diagram illustrating an exemplary method of monitoring a potential landing zone by a flight controller 600 is presented. At step 605, method 600 may include receiving a plurality of data of potential landing zone 112 by at least a sensor 104. Potential landing zone 112 may include at least a first potential landing zone and any landing zone described in the entirety of this disclosure. At least a sensor 104 may include any sensor described in the entirety of this disclosure. Step 605 may further include receiving the plurality of data wherein the plurality of data includes at least an outside parameter 108. Outside parameter 108 may include any outside parameter described in the entirety of this disclosure.

With continued reference to FIG. 6, at step 610, method 600 may include determining a landing safety datum 128 as a function of at least a safety parameter and the plurality of data from at least the sensor 104. Step 610 may include a landing zone database 132 for the determining of the landing safety datum 128. Landing zone database 132 may include any landing zone database as described in the entirety of this disclosure. Step 610 may include comparing the plurality of data as a health status to the safety parameter wherein safety parameter may include any safety parameter described in the entirety of this disclosure.

With continued reference to FIG. 6, at step 615, method 600 may include transmitting landing safety datum 128 to an output device 144. Output device 144 may include any output device described in the entirety of this disclosure. Step 615 may include generating a landing assessment datum including, but not limited to, at least a landing confirmation 308, at least a landing zone hologram 312, and the like. A person of ordinary skill in the art, upon reviewing the entirety of this disclosure, would appreciate the method of monitoring in the context of landing of an electric aircraft.

Figure 7:
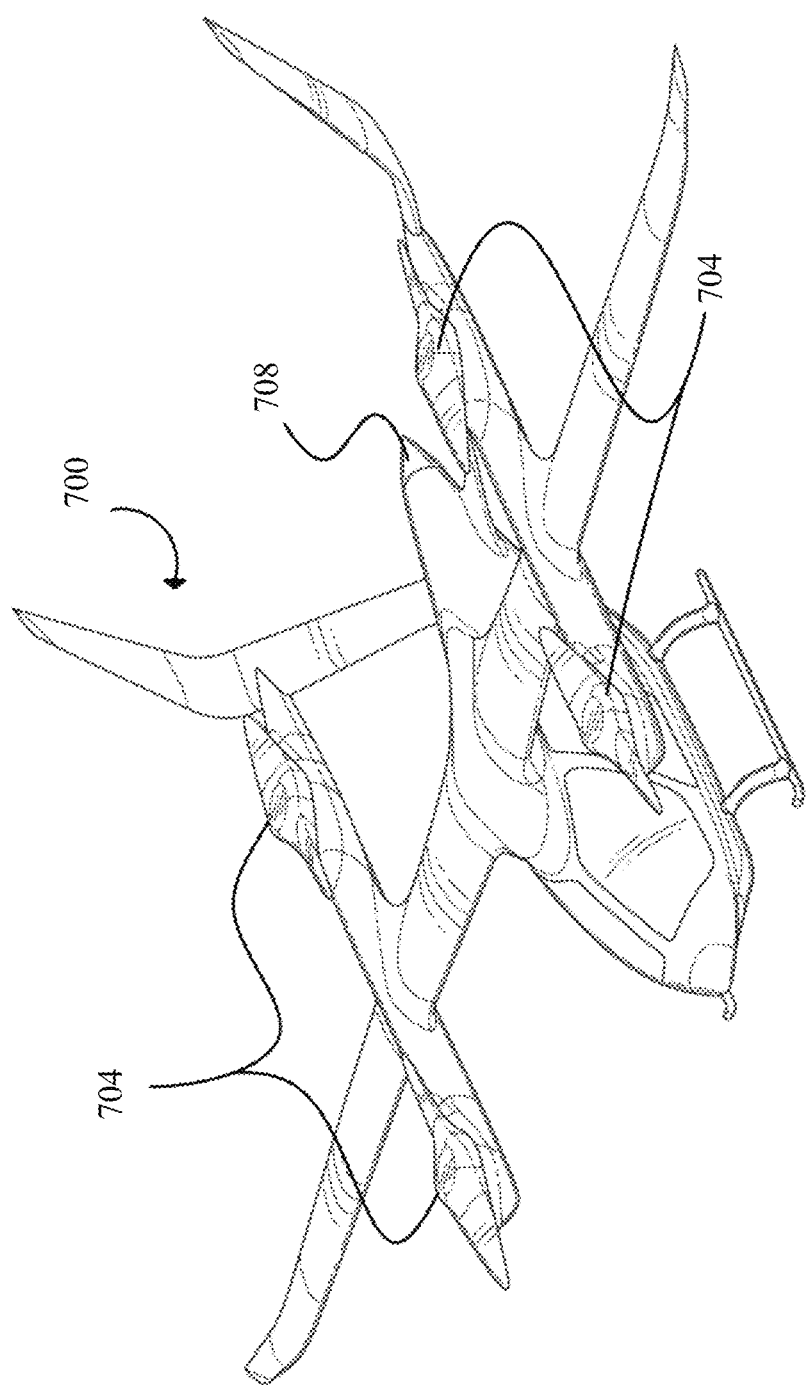
FIG. 7 is an illustrative embodiment of an electric aircraft.

Referring now to FIG. 7, an embodiment of an electric aircraft 700 is presented. Still referring to FIG. 7, electric aircraft 700 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 7, a number of aerodynamic forces may act upon the electric aircraft 700 during flight. Forces acting on an electric aircraft 700 during flight may include, without limitation, thrust, the forward force produced by the rotating element of the electric aircraft 700 and acts parallel to the longitudinal axis. Another force acting upon electric aircraft 700 may be, without limitation, drag, which may be defined as a rearward retarding force which is caused by disruption of airflow by any protruding surface of the electric aircraft 700 such as, without limitation, the wing, rotor, and fuselage. Drag may oppose thrust and acts rearward parallel to the relative wind. A further force acting upon electric aircraft 700 may include, without limitation, weight, which may include a combined load of the electric aircraft 700 itself, crew, baggage, and/or fuel. Weight may pull electric aircraft 700 downward due to the force of gravity. An additional force acting on electric aircraft 700 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 700 are designed to be as lightweight as possible. Reducing the weight of the aircraft and designing to reduce the number of components is essential to optimize the weight. To save energy, it may be useful to reduce weight of components of an electric aircraft 700, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 700 and/or propulsors.

Referring still to FIG. 7, Aircraft may include at least a vertical propulsor 704 and at least a forward propulsor 708. A forward propulsor is a propulsor that propels the aircraft in a forward direction. Forward in this context is not an indication of the propulsor position on the aircraft; one or more propulsors mounted on the front, on the wings, at the rear, etc. A vertical propulsor is a propulsor that propels the aircraft in an upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 704 is a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

With continued reference to FIG. 7, at least a forward propulsor 708 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 704 and at least a forward propulsor 708 includes a thrust element. At least a thrust element may include any device or component that converts the mechanical energy of a motor, for instance in the form of rotational motion of a shaft, into thrust in a fluid medium.

At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 7, during flight, a number of forces may act upon the electric aircraft. Forces acting on an aircraft 700 during flight may include thrust, the forward force produced by the rotating element of the aircraft 700 and acts parallel to the longitudinal axis. Drag may be defined as a rearward retarding force which is caused by disruption of airflow by any protruding surface of the aircraft 700 such as, without limitation, the wing, rotor, and fuselage. Drag may oppose thrust and acts rearward parallel to the relative wind. Another force acting on aircraft 700 may include weight, which may include a combined load of the aircraft 700 itself, crew, baggage, and fuel. Weight may pull aircraft 700 downward due to the force of gravity. An additional force acting on aircraft 700 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

Figure 8:
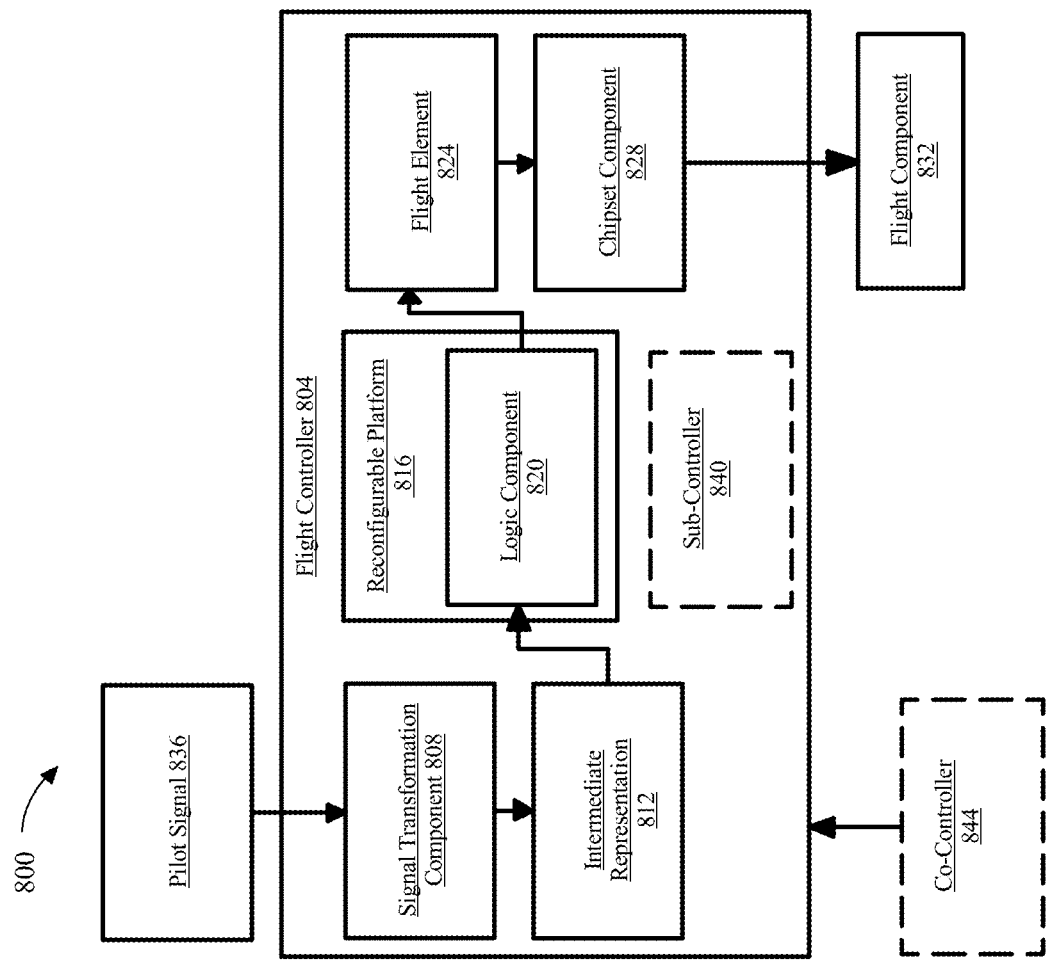
FIG. 8 is a block diagram illustrating a flight controller.

Now referring to FIG. 8, an exemplary embodiment 800 of a flight controller 804 is illustrated. Flight controller 804 may include and/or communicate with any computing device as described in this disclosure, including without limitation a microcontroller, microprocessor, digital signal processor (DSP) and/or system on a chip (SoC) as described in this disclosure. Further, flight controller 804 may include a single computing device operating independently, or may include two or more computing device operating in concert, in parallel, sequentially or the like; two or more computing devices may be included together in a single computing device or in two or more computing devices. In embodiments, flight controller 804 may be installed in an aircraft, may control the aircraft remotely, and/or may include an element installed in the aircraft and a remote element in communication therewith.

In an embodiment, and still referring to FIG. 8, flight controller 804 may include a signal transformation component 808. As used in this disclosure a "signal transformation component" is a component that transforms and/or converts a first signal to a second signal, wherein a signal may include one or more digital and/or analog signals. For example, and without limitation, signal transformation component 808 may be configured to perform one or more operations such as preprocessing, lexical analysis, parsing, semantic analysis, and the like thereof. In an embodiment, and without limitation, signal transformation component 808 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 808 may include transforming one or more low-level languages such as, but not limited to, machine languages and/or assembly languages. For example, and without limitation, signal transformation component 808 may include transforming a binary language signal to an assembly language signal. In an embodiment, and without limitation, signal transformation component 808 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 8, signal transformation component 808 may be configured to optimize an intermediate representation 812. As used in this disclosure an "intermediate representation" is a data structure and/or code that represents the input signal. Signal transformation component 808 may optimize intermediate representation as a function of a data-flow analysis, dependence analysis, alias analysis, pointer analysis, escape analysis, and the like thereof. In an embodiment, and without limitation, signal transformation component 808 may optimize intermediate representation 812 as a function of one or more inline expansions, dead code eliminations, constant propagation, loop transformations, and/or automatic parallelization functions. In another embodiment, signal transformation component 808 may optimize intermediate representation as a function of a machine dependent optimization such as a peephole optimization, wherein a peephole optimization may rewrite short sequences of code into more efficient sequences of code. Signal transformation component 808 may optimize intermediate representation to generate an output language, wherein an "output language," as used herein, is the native machine language of flight controller 804. For example, and without limitation, native machine language may include one or more binary and/or numerical languages.

In an embodiment, and without limitation, signal transformation component 808 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 8, flight controller 804 may include a reconfigurable hardware platform 816. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 816 may be reconfigured to enact any algorithm and/or algorithm selection process received from another computing device and/or created using machine-learning processes.

Still referring to FIG. 8, reconfigurable hardware platform 816 may include a logic component 820. As used in this disclosure a "logic component" is a component that executes instructions on output language. For example, and without limitation, logic component may perform basic arithmetic, logic, controlling, input/output operations, and the like thereof. Logic component 820 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 820 may be organized according to Von Neumann and/or Harvard architecture as a non-limiting example. Logic component 820 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 820 may include one or more integrated circuit microprocessors, which may contain one or more central processing units, central processors, and/or main processors, on a single metal-oxide-semiconductor chip. Logic component 820 may be configured to execute a sequence of stored instructions to be performed on the output language and/or intermediate representation 812. Logic component 820 may be configured to fetch and/or retrieve the instruction from a memory cache, wherein a "memory cache," as used in this disclosure, is a stored instruction set on flight controller 804. Logic component 820 may be configured to decode the instruction retrieved from the memory cache to opcodes and/or operands. Logic component 820 may be configured to execute the instruction on intermediate representation 812 and/or output language. For example, and without limitation, logic component 820 may be configured to execute an addition operation on intermediate representation 812 and/or output language.

In an embodiment, and without limitation, logic component 820 may be configured to calculate a flight element 824. As used in this disclosure a "flight element" is an element of datum denoting a relative status of aircraft. For example, and without limitation, flight element 824 may denote one or more torques, thrusts, airspeed velocities, forces, altitudes, groundspeed velocities, directions during flight, directions facing, forces, orientations, and the like thereof. For example, and without limitation, flight element 824 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 824 may denote that aircraft is following a flight path accurately and/or sufficiently.

Still referring to FIG. 8, flight controller 804 may include a chipset component 828. As used in this disclosure a "chipset component" is a component that manages data flow. In an embodiment, and without limitation, chipset component 828 may include a northbridge data flow path, wherein the northbridge dataflow path may manage data flow from logic component 820 to a high-speed device and/or component, such as a RAM, graphics controller, and the like thereof. In another embodiment, and without limitation, chipset component 828 may include a southbridge data flow path, wherein the southbridge dataflow path may manage data flow from logic component 820 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally, or alternatively, chipset component 828 may manage data flow between logic component 820, memory cache, and a flight component 832. As used in this disclosure a "flight component" is a portion of an aircraft that can be moved or adjusted to affect one or more flight elements. For example, flight component 632 may include a component used to affect the aircrafts' roll and pitch which may comprise one or more ailerons. As a further example, flight component 832 may include a rudder to control yaw of an aircraft. In an embodiment, chipset component 828 may be configured to communicate with a plurality of flight components as a function of flight element 824. For example, and without limitation, chipset component 828 may transmit to an aircraft rotor to reduce torque of a first lift propulsor and increase the forward thrust produced by a pusher component to perform a flight maneuver.

Still referring to FIG. 8, flight controller may include a sub-controller 840. As used in this disclosure a "sub-controller" is a controller and/or component that is part of a distributed controller as described above; for instance, flight controller 804 may be and/or include a distributed flight controller made up of one or more sub-controllers. For example, and without limitation, sub-controller 840 may include any controllers and/or components thereof that are similar to distributed flight controller and/or flight controller as described above. Sub-controller 840 may include any component of any flight controller as described above. Sub-controller 840 may be implemented in any manner suitable for implementation of a flight controller as described above. As a further non-limiting example, sub-controller 840 may include one or more processors, logic components and/or computing devices capable of receiving, processing, and/or transmitting data across the distributed flight controller as described above. As a further non-limiting example, sub-controller 840 may include a controller that receives a signal from a first flight controller and/or first distributed flight controller component and transmits the signal to a plurality of additional sub-controllers and/or flight components.

Still referring to FIG. 8, flight controller may include a co-controller 844. As used in this disclosure a "co-controller" is a controller and/or component that joins flight controller 804 as components and/or nodes of a distributer flight controller as described above. For example, and without limitation, co-controller 844 may include one or more controllers and/or components that are similar to flight controller 804. As a further non-limiting example, co-controller 844 may include any controller and/or component that joins flight controller 804 to distributer flight controller. As a further non-limiting example, co-controller 844 may include one or more processors, logic components and/or computing devices capable of receiving, processing, and/or transmitting data to and/or from flight controller 804 to distributed flight control system. Co-controller 844 may include any component of any flight controller as described above. Co-controller 844 may be implemented in any manner suitable for implementation of a flight controller as described above.

In an embodiment, and with continued reference to FIG. 8, flight controller 804 may be designed and/or configured to perform any method, method step, or sequence of method steps in any embodiment described in this disclosure, in any order and with any degree of repetition. For instance, flight controller 804 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 8, flight controller 804 may also be implemented using a "shared nothing" architecture in which data is cached at the worker, in an embodiment, this may enable scalability of aircraft and/or computing device. Flight controller 804 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks.

Figure 9:
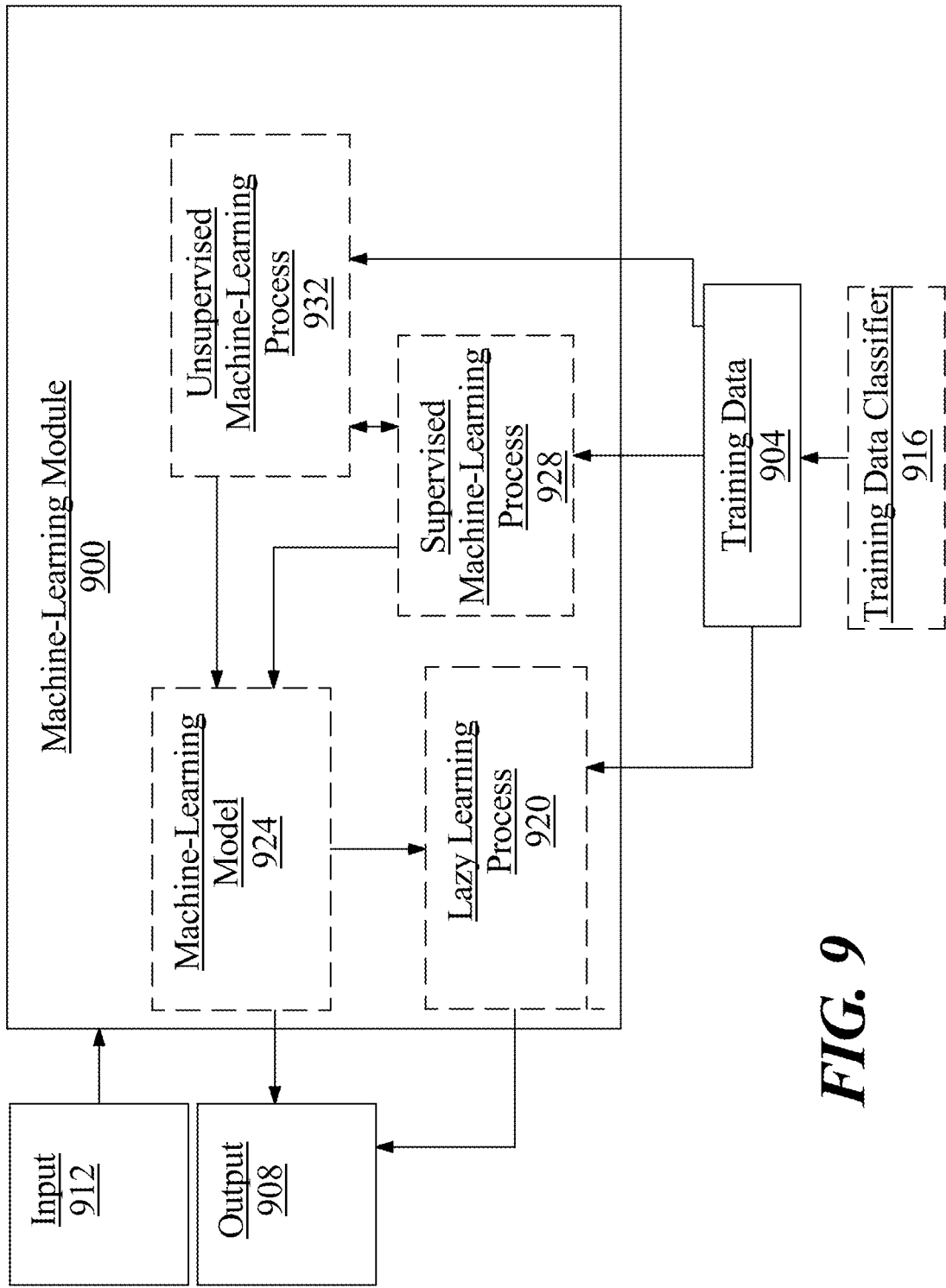
FIG. 9 is an exemplary embodiment of a machine-learning module.

Referring now to FIG. 9, an exemplary embodiment of a machine-learning module 900 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 904 to generate an algorithm that will be performed by a computing device/module to produce outputs 908 given data provided as inputs 912; this is in contrast to a non-machine learning software program where the commands to be executed are determined in advance by a user and written in a programming language.

Still referring to FIG. 9, "training data," as used herein, is data containing correlations that a machine-learning process may use to model relationships between two or more categories of data elements. For instance, and without limitation, training data 904 may include a plurality of data entries, each entry representing a set of data elements that were recorded, received, and/or generated together; data elements may be correlated by shared existence in a given data entry, by proximity in a given data entry, or the like. Multiple data entries in training data 904 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 904 according to various correlations; correlations may indicate causative and/or predictive links between categories of data elements, which may be modeled as relationships such as mathematical relationships by machine-learning processes as described in further detail below. Training data 904 may be formatted and/or organized by categories of data elements, for instance by associating data elements with one or more descriptors corresponding to categories of data elements. As a non-limiting example, training data 904 may include data entered in standardized forms by persons or processes, such that entry of a given data element in a given field in a form may be mapped to one or more descriptors of categories. Elements in training data 904 may be linked to descriptors of categories by tags, tokens, or other data elements; for instance, and without limitation, training data 904 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 9, training data 904 may include one or more elements that are not categorized; that is, training data 904 may not be formatted or contain descriptors for some elements of data. Machine-learning algorithms and/or other processes may sort training data 904 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 904 to be made applicable for two or more distinct machine-learning algorithms as described in further detail below. Training data 904 used by machine-learning module 900 may correlate any input data as described in this disclosure to any output data as described in this disclosure. As a non-limiting illustrative example outside parameter and potential landing zone may be inputs and landing zone classifier, and at least a landing assessment datum may be outputs.

Further referring to FIG. 9, training data may be filtered, sorted, and/or selected using one or more supervised and/or unsupervised machine-learning processes and/or models as described in further detail below; such models may include without limitation a training data classifier 916. Training data classifier 916 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 900 may generate a classifier using a classification algorithm, defined as a process whereby a computing device and/or any module and/or component operating thereon derives a classifier from training data 904. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 9, machine-learning module 900 may be configured to perform a lazy-learning process 920 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 904. Heuristic may include selecting some number of highest-ranking associations and/or training data 904 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 9, machine-learning processes as described in this disclosure may be used to generate machine-learning models 924. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 924 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 924 may be generated by creating an artificial neural network, such as a convolutional neural network comprising an input layer of nodes, one or more intermediate layers, and an output layer of nodes. Connections between nodes may be created via the process of "training" the network, in which elements from a training data 904 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, machine-learning algorithms may include at least a supervised machine-learning process 928. At least a supervised machine-learning process 928, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 904. Persons skilled in the art, upon reviewing the entirety of this disclosure, will be aware of various possible variations of at least a supervised machine-learning process 928 that may be used to determine relation between inputs and outputs. Supervised machine-learning processes may include classification algorithms as defined above.

Further referring to FIG. 9, machine learning processes may include at least an unsupervised machine-learning processes 932. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 9, machine-learning module 900 may be designed and configured to create a machine-learning model 924 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 9, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
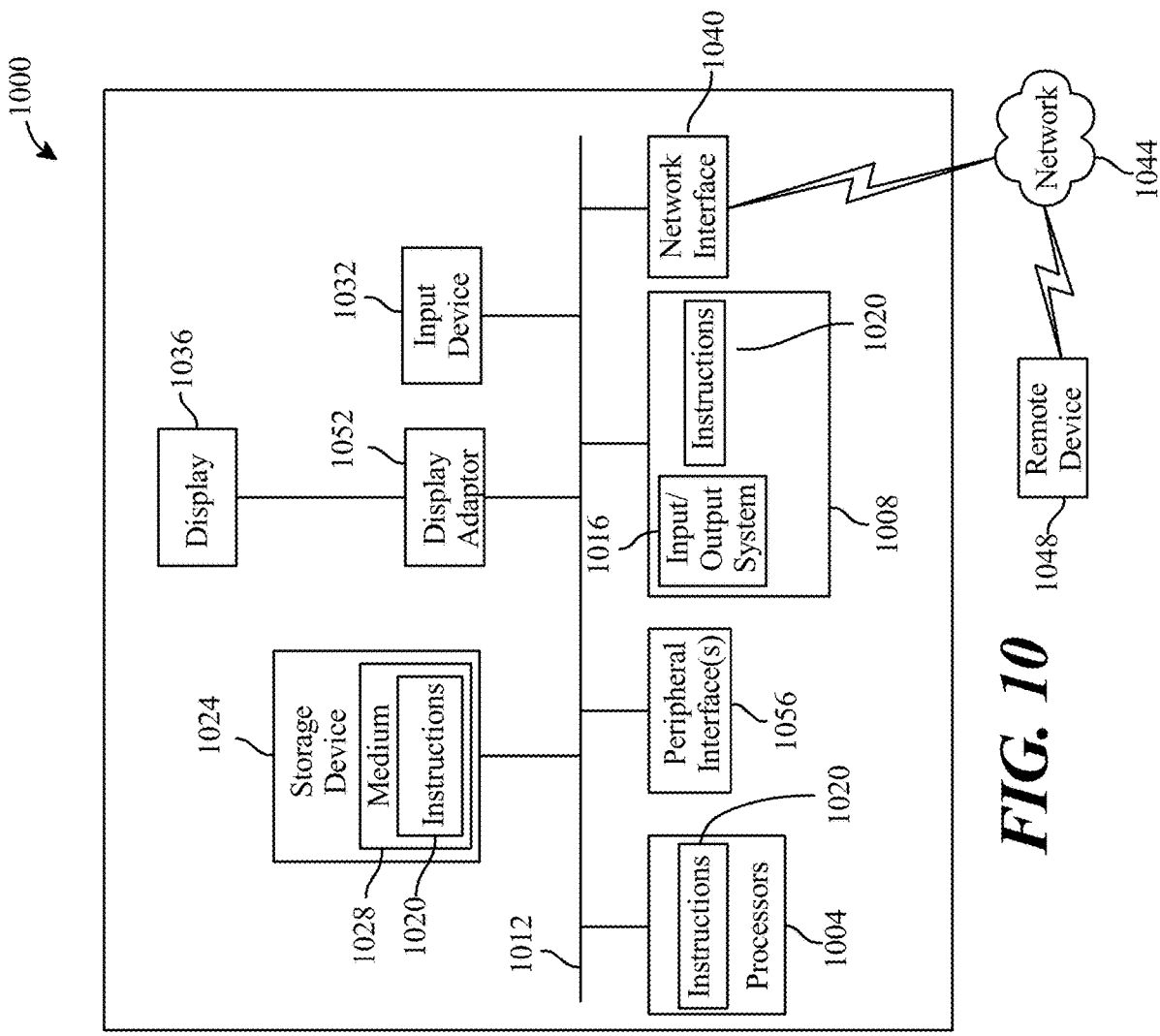
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for monitoring a landing zone of an electric aircraft, the system comprising:
    at least a sensor, the at least a sensor configured to continuously capture a plurality of data related to a first potential landing zone of an electric aircraft as the electric aircraft approaches the first potential landing zone;
    a processor, the processor configured to:
        receive the plurality of data from the at least a sensor; and
        determine a landing safety datum as a function of the plurality of data and at least a safety parameter; and
    an output device, the output device configured to:
        receive the plurality of data and the landing safety datum from the processor; and
        display, to the pilot:
            the landing safety datum; and
            a locator component, the locator component configured to capture a second potential landing zone of the electric aircraft that is distinct from the first potential landing zone.

2. The system of claim 1, wherein the landing safety datum comprises an outside parameter of the first potential landing zone.

3. The system of claim 2, wherein the plurality of data measured by the at least a sensor comprises environmental elements of an area surrounding the first potential landing zone.

4. The system of claim 1, wherein the at least a sensor is further configured to periodically calculate a validity of the first potential landing zone.

5. The system of claim 1, wherein the at least a sensor is further configured to dynamically calculate a validity of the first potential landing zone.

6. The system of claim 1, wherein the at least a sensor comprises at least a camera.

7. The system of claim 1, wherein the at least a sensor comprises a motion sensor.

8. The system of claim 1, wherein the plurality of data comprises data regarding a state of the first potential landing zone.

9. The system of claim 8, wherein the state of the first potential landing zone comprises information describing a potential landing, the information comprising:
    at least location and/or size of obstacle;
    at least geographic data; and
    at least temperature data.

10. The system of claim 1, wherein the output device comprises a pilot display.

11. The system of claim 1, wherein the output device comprises an augmented reality device.

12. The system of claim 1, wherein the processor is further configured to calculate a landing assessment datum using a landing zone classifier, wherein the landing zone classifier takes a landing safety parameter as input.

13. The system of claim 12, wherein the landing assessment datum includes at least a percentage indicative of the safety of a potential landing zone.

14. The system of claim 1, wherein the processor is further configured to verify a potential landing zone as a function of at least a landing zone database.

15. The system of claim 1, wherein the determining of the landing safety datum comprises comparing at least a potential landing zone and a safety parameter from a landing zone database.

16. The system of claim 1, wherein a landing confirmation comprises at least a symbol.

17. The system of claim 16, wherein the symbol comprises at least a warning sign.

18. The system of claim 16, wherein the symbol comprises at least a sign, the sign including at least a land indicator.

19. The system of claim 14, wherein the landing zone database comprises at least an acceptance criterion.

20. The system of claim 1, wherein the at least a sensor comprises a LIDAR system.

* * * * *